United States Patent [19]
Zanella

[11] Patent Number: 5,256,841
[45] Date of Patent: Oct. 26, 1993

[54] SELF-LOCKING SWITCH UNIT

[75] Inventor: John H. Zanella, Oxford, Conn.

[73] Assignee: General Electric, New York, N.Y.

[21] Appl. No.: 907,274

[22] Filed: Jul. 1, 1992

[51] Int. Cl.⁵ .............................................. H01H 9/02
[52] U.S. Cl. .................................. 200/296; 248/27.1; 361/807
[58] Field of Search .............. 200/295, 296, 564, 565; 248/27.1, 27.3; 361/346, 347, 417, 419, 420

[56] References Cited

U.S. PATENT DOCUMENTS

| | | | |
|---|---|---|---|
| 2,272,688 | 2/1942 | Catron | 200/296 X |
| 2,616,643 | 11/1952 | Budd | 248/27.1 |
| 2,969,443 | 1/1961 | Barden et al. | 200/295 X |
| 4,314,220 | 2/1982 | Ito et al. | 361/419 X |
| 4,586,843 | 5/1986 | Herg et al. | 248/27.1 X |
| 4,715,569 | 12/1987 | Essig et al. | 248/27.1 |
| 4,948,949 | 8/1990 | Meisner et al. | 200/296 X |

Primary Examiner—Henry J. Recla
Assistant Examiner—Glenn T. Barrett
Attorney, Agent, or Firm—Richard A. Menelly

[57] ABSTRACT

A electric switch is formed in the shape of a container having a front plate adapted for lockingly engaging an opening in an appliance control panel when the switch is rotatingly inserted within the opening in a clockwise direction. The front plate is shaped to allow orientation of the switch in a predetermined position. To unlock the switch from the panel for replacement or repair, the switch must be rotated in the counter-clockwise direction. A spring-loaded cam attached to the front plate engages a separate opening in the panel to prevent inadvertent removal of the switch during operation.

7 Claims, 3 Drawing Sheets

SELF-LOCKING SWITCH UNIT

BACKGROUND OF THE INVENTION

Compact electric and pushbutton type switches that are capable of attachment to large electric appliances such as air conditioners, electric ranges and the like without screws or rivets are usually press-fitted within an opening in the appliance control panel. This arrangement could present a problem during high speed manufacturing and assembly when the switches must be removed for replacement or repair.

U.S. Pat. No. 4,715,569 describes a switch that is attached to a panel by means of protrusions that extend from the switch baseplate through an opening within the panel and become tightly held in position within the opening by virtue of the close tolerances designed into the protrusions as well as by the resilient plastic material used to form the protrusions. A spring-loaded cam extending from the baseplate is received in a separate aperture in the panel to further secure the switch to the panel.

Other switches that are retained within panels without using fastening screws or rivets usually either press-fit a part of the switch within the panel opening or deform part of the switch material to assist in holding the switch within the panel opening. It would be economically advantageous to provide such switches with means for retaining the switch within a panel opening while still allowing the switch to be readily removed both during the assembly process as well as in the field.

One purpose of the instant invention is to provide a switch that is capable of high speed assembly to a panel without requiring any fastening means while allowing the switch to be removed both during the assembly operation as well as in the field.

SUMMARY OF THE INVENTION

A switch unit includes a baseplate adapted for retention within a support panel by integrally-shaping a pair of upstanding tabs on either side of the switch shank that receives the switch knob. An arm formed on the baseplate includes a locking tab upstanding from one end. The panel that supports the switch has a first opening which defines a large and small slot. One of the tabs is sized to fit within one slot while the other tab fits within the other slot to polarize insertion and removal of the switch. Clockwise rotation of the switch within the opening lockingly retains the switch, while counterclockwise rotation allows the switch to be removed. A second opening offset from the first opening receives the upstanding locking tab on the end of an extended arm to prevent rotation in either direction until the tab is displaced from the second opening.

DESCRIPTION OF THE PREFERRED EMBODIMENT

Figure 1:
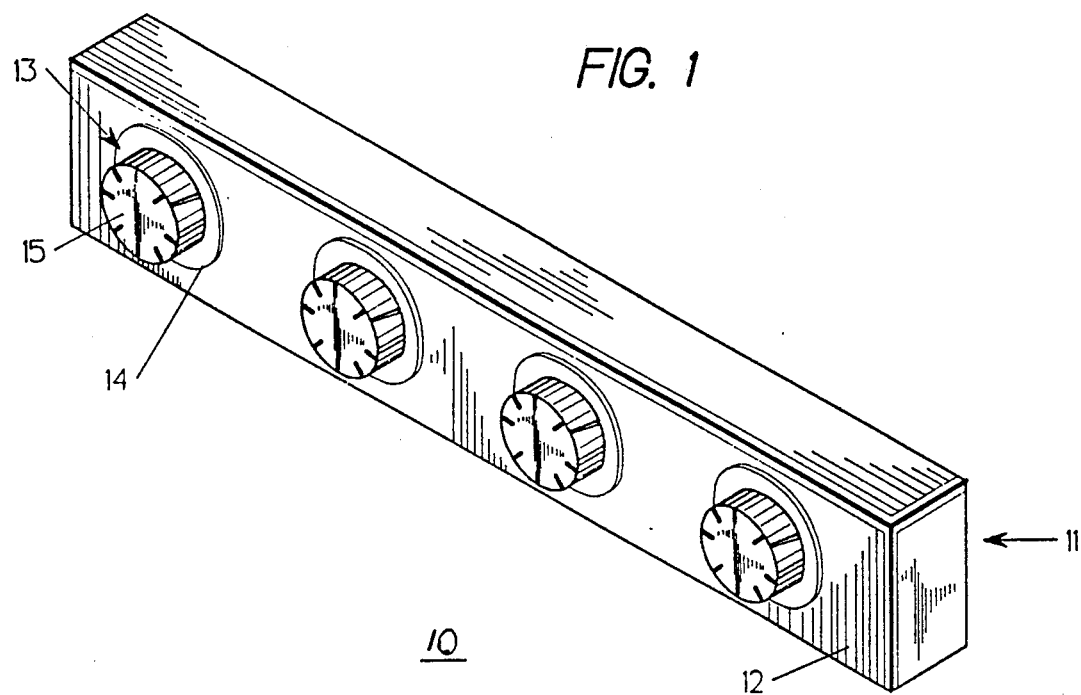
FIG. 1 is a front perspective view of an appliance control panel containing the switch unit in accordance with the invention.

A control panel 10 for an electric appliance such as air conditioners, electric ranges and the like is shown in FIG. 1. The panel is in the form of a metal housing 11 which includes a front wall 12 to which are attached a plurality of electric timers and electric switches 13 which include a knob 15 centrally arranged within a circular indicia plate 14.

Figure 2:
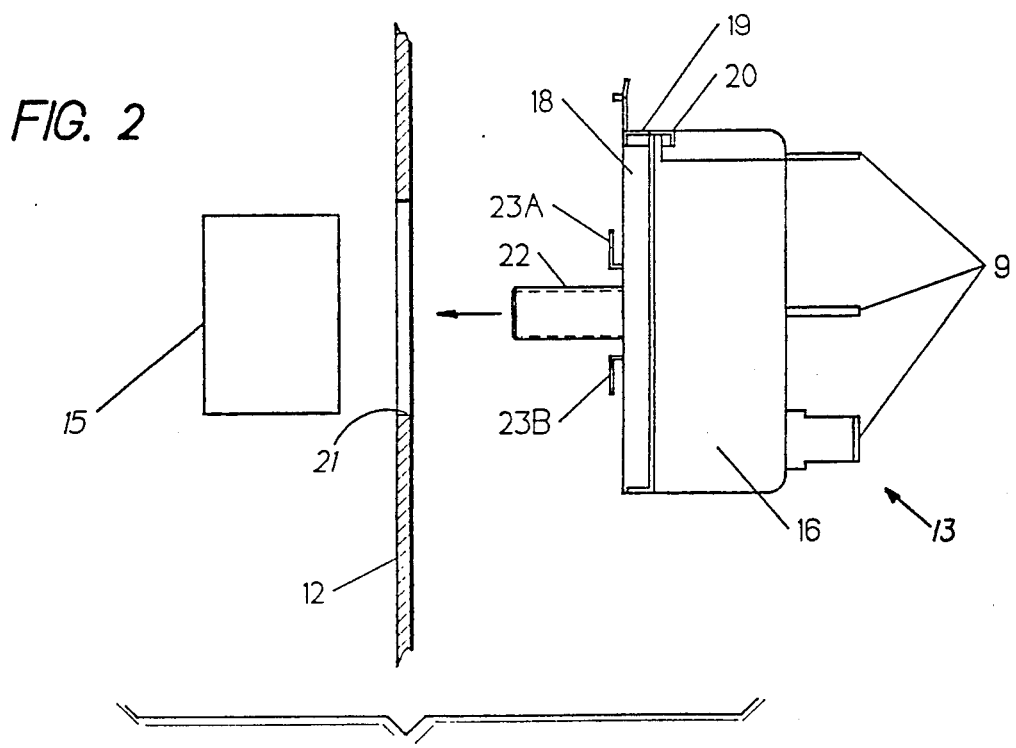
FIG. 2 is a side view in partial section of the switch unit of FIG. 1 prior to assembly within the panel of FIG. 1.

The switch 13 is attached to the panel by inserting the switch shank or post 22 and up-turned tabs 23A, 23B through an aperture 21 formed within the front wall 12 as best seen in FIG. 2. The tabs are integrally lanced from a metal support base 18 to which the switch body 16 which contains the switch electrical components are attached by means of the arms 19 which extend along both sides of the body and are secured by means of tabs 20 formed at the end of the arms. Electrical connection with the electrical components contained within the body 16 is made by means of extending pin connectors 9. After the support base is secured to the front wall, the switch knob 15 is attached to the end of the post 22.

Figure 3:
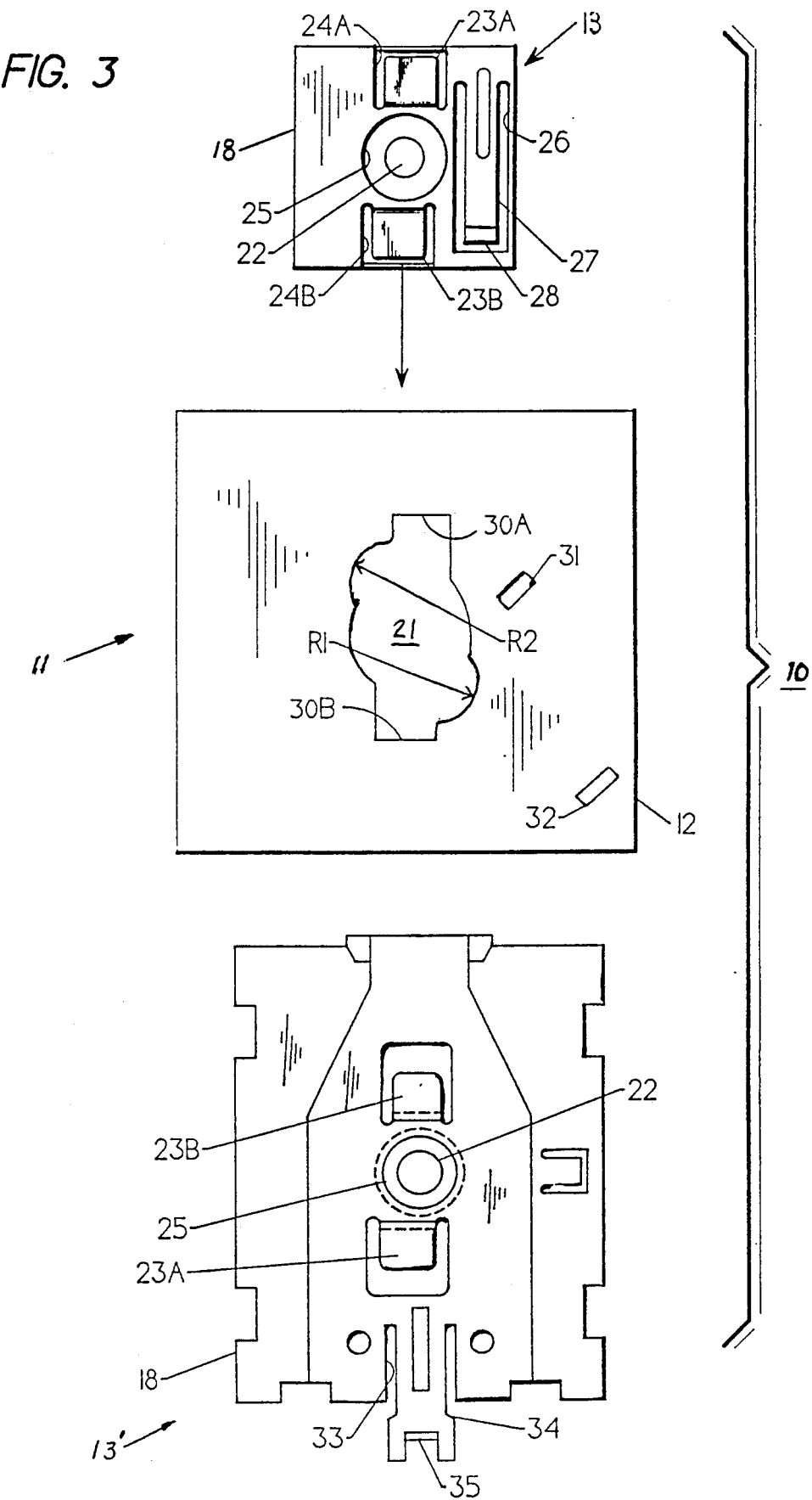
FIG. 3 is a front plan view of two embodiments of the switch unit of the invention prior to assembly within the panel of FIG. 1.

A part of the switch panel 10 is shown in FIG. 3 prior to attaching a standard-sized switch 13 or a larger-sized switch 13' to the front wall 12. As described earlier, the support base 18 has a pair of upstanding tabs 23A, 23B lanced therein and leaves corresponding rectangular slots 24A, 24B on opposite sides of a circular opening 25 through which the switch post 22 extends. To prevent the switch from free rotation within the aperture 21 in the front wall 12, an arm 27 is lanced from the support base 18 and includes a raised tab 28 at one end leaving an elongated rectangular slot 26 within the support base.

The aperture 21 formed within the front wall 12 has a double-ended key-hole configuration wherein a smaller radius R1 and a larger radius R2 only allows rotation of the switch in one direction for attaching the switch and in an opposite direction to remove the switch. The smaller upstanding tab 23A is received within the corresponding smaller slot 30A while the larger upstanding tab 23B is received within the larger slot 30B. The rectangular slot 31 formed within the front wall proximate the aperture captures the upstanding tab 28 on the end of the arm 27 as the switch is rotated and thereby prevents further rotation of the switch. The provision of the sized tabs and slots to polarize the direction of rotation of the switch within the aperture is an important feature of this invention. The arm spring-loads the tab within the slot in a cam-like fashion and prevents the switch from rotation in either direction until a tool, such as the tip of a screwdriver, is used to displace the tab from the slot. The larger switch 13' also includes upstanding tabs 23A, 23B on either side of the circular opening 25. However, the arm 34 extends beyond the end of the support base 18. A rectangular slot 33 is formed within the support base, and the upstanding tab 35 formed on the end of the arm is received within the rectangular slot 32 that is distal the aperture when the switch is rotated in the clockwise direction as described earlier.

Figure 4:
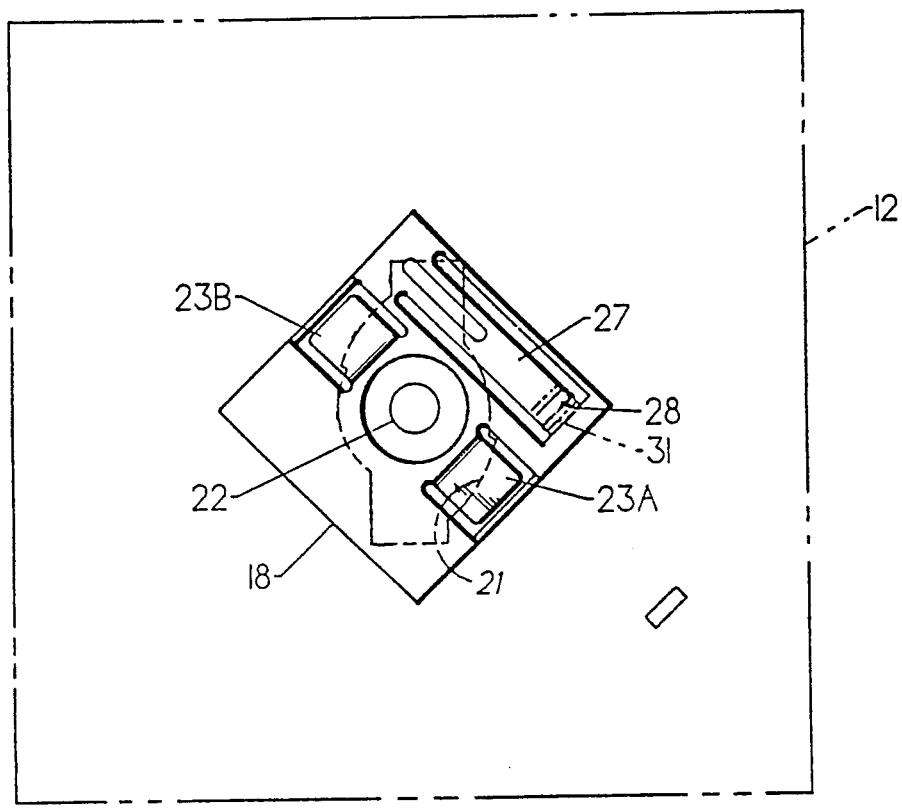
FIG. 4 is a front plan view of one of the switch units of FIG. 3 after assembly.

The front wall 12 is depicted in phantom in FIG. 4 to show the rotational displacement of the switch base 18 and the arrangement of the tabs 23A, 23B within the aperture 21. The tab 28, formed at the end of the arm 27 is captured within the rectangular slot 31 in the front wall 12 and the switch post 22 remains centrally located within the aperture 21. As described earlier, the switch is removed by depressing the tab 28 and rotating the switch plate 18 in the opposite direction. The dimensions of the tabs 23A, 23B insure that the switch plate can only be rotated in one direction for insertion and in the opposite direction for removal which is an important feature of this invention.

Figure 5:
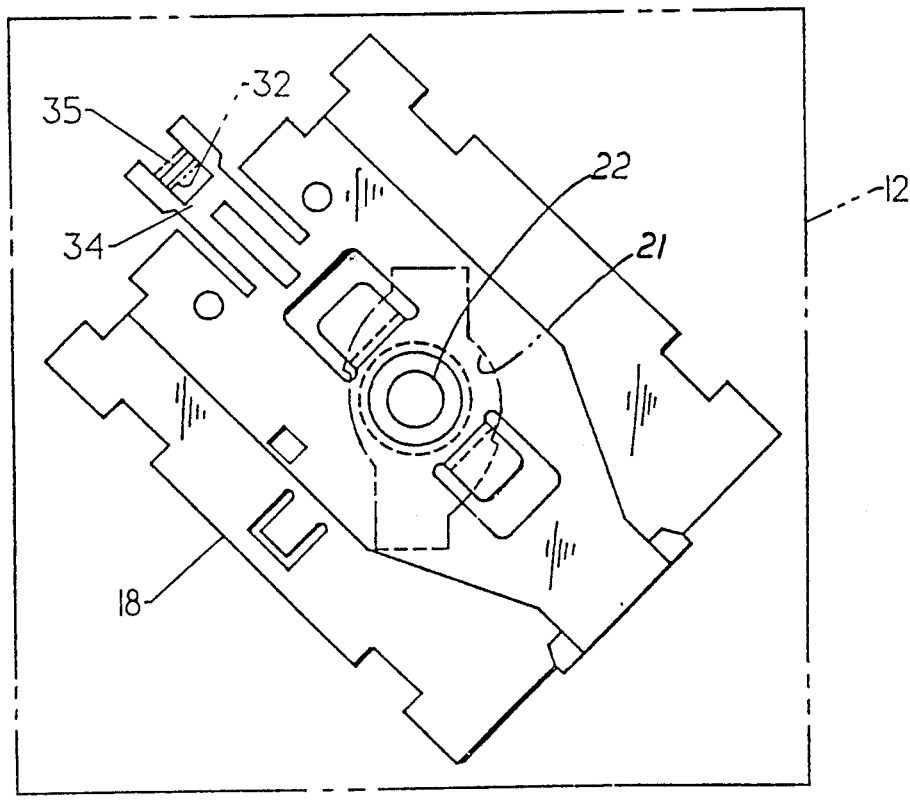
FIG. 5 is a front plan view of the other of the switch units of FIG. 3 after assembly.

The front wall 12 is also depicted in phantom in FIG. 5 to show the rotational displacement of the support base 18 and the capture of the tab 35 at the end of the arm 34 within the rectangular slot 32 with the switch post 22 centrally located within the aperture 21. The tab 35 on the end of the arm 34, when trapped within the rectangular slot 32, restrains the support base 18 from rotation in either direction.

A switch unit has herein been described that is removably inserted within an appliance switch panel without requiring any auxiliary fastening means whatsoever.

Having thus described my invention, what I claim as new and desire to secure by Letters Patent is:

1. An electric switch assembly with self-contained mounting structure comprising:
   a unitary mounting base having a centrally located circular aperture adapted for receiving an electric switch shaft;
   means extending above one surface of said base adapted for attaching said base to a switch body;
   a first raised tab lanced along a perimeter of said aperture and extending a first predetermined distance above said base;
   a second raised tab lanced along said perimeter extending said first predetermined distance above said base, said first and raised tabs adapted for holding said switch body to a support panel; and
   an elongated lever extending a second predetermined distance along said base, said lever including an up-turned retention tab at one end thereof, said support panel being adapted for receiving said switch shaft on one side thereof and said switch base on an opposite side thereof, said support panel including a double-ended key-hole slot formed therein, said key-hole slot terminating in a pair of first and second rectangular slots having first and second corresponding widths.

2. The switch assembly of claim 1 wherein said first tab comprises a first rectangle having a first predetermined dimension and said second tab comprises a second rectangle having a second predetermined dimension, said first dimension being greater than said second dimension.

3. The switch assembly of claim 1 wherein said means further comprises a pair of extended arms including off-set tabs arranged at an end opposite said one surface and extending upwards from said one surface.

4. The switch assembly of claim 1 wherein said first width is greater than said second width and wherein said first slot accepts said first tab and rejects said second dimension.

5. The switch assembly of claim 1 wherein said key-hole slot comprises a first radius defining a first partial perimeter formed central to said key-hole slot accepting said switch shaft.

6. The switch assembly of claim 5 wherein said key-hole slot includes a second radius greater than said first radius, said second radius defining a second partial perimeter adjacent each of said rectangular slots, said second perimeter thereby limiting rotation of said base in a preferred clockwise or counter-clockwise direction.

7. The switch assembly of claim 6 wherein said support panel includes a second aperture apart from said circular aperture, said second aperture capturing said up-turned tab when said base is rotated in said preferred clockwise or counter-clockwise direction.

* * * * *